United States Patent
Chong et al.

(10) Patent No.: US 10,575,219 B2
(45) Date of Patent: Feb. 25, 2020

(54) CIRCUIT SWITCHED FALLBACK METHOD, NETWORK DEVICE, AND SYSTEM

(71) Applicant: Huawei Technologies Co., Ltd., Shenzhen, Guangdong (CN)

(72) Inventors: Weiwei Chong, Shanghai (CN); Xiaobo Wu, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/803,581

(22) Filed: Nov. 3, 2017

(65) Prior Publication Data
US 2018/0063755 A1    Mar. 1, 2018

Related U.S. Application Data

(63) Continuation of application No. PCT/CN2015/078247, filed on May 5, 2015.

(51) Int. Cl.
*H04W 36/00*    (2009.01)

(52) U.S. Cl.
CPC ... *H04W 36/0022* (2013.01); *H04W 36/0033* (2013.01)

(58) Field of Classification Search
CPC ............. H04W 36/00; H04W 36/0022; H04W 36/0033; H04W 36/0083
See application file for complete search history.

(56) References Cited

U.S. PATENT DOCUMENTS 6,845,095 B2 * 1/2005 Krishnarajah ........ H04W 28/06
                                                  370/349
8,755,312 B2 * 6/2014 Liang ................ H04W 36/0055
                                                  370/310

(Continued)

FOREIGN PATENT DOCUMENTS

CN    102474783 A    5/2012
CN    103188751 A    7/2013

(Continued)

OTHER PUBLICATIONS

3rd Generation Partnership Project, Technical Specification Group Services and System Aspects; Circuit Switched (CS) fallback in Evolved Packet System (EPS); 3GPP, Version 12.5.0, Release 12 (Year: 2015).*

(Continued)

*Primary Examiner* — Eric Nowlin
(74) *Attorney, Agent, or Firm* — Womble Bond Dickinson (US) LLP

(57) ABSTRACT

Embodiments of the present disclosure disclose a circuit switched fallback method, a network device, and a system. The method includes: determining, by the network device, that a serving cell handover process of UE is ended; determining, by the network device, that before the serving cell handover process of the UE is ended, it has been determined that the UE needs to be moved to a second network supporting a circuit switched service; and moving, by the network device, the UE to the second network. According to the foregoing method, when CSFB triggered by a CS service initiated by UE conflicts with a serving cell handover process of the UE, the CS service of the UE can continue to be performed after completing the serving cell handover process of the UE. In this way, a success rate of establishing the CS service is increased.

18 Claims, 5 Drawing Sheets

(56) References Cited

U.S. PATENT DOCUMENTS

| | | | | |
|---|---|---|---|---|
| 8,971,263 | B2* | 3/2015 | Johansson | H04W 28/24 370/329 |
| 9,838,924 | B2* | 12/2017 | Zhu | H04W 36/0066 |
| 10,015,712 | B2* | 7/2018 | Bi | H04W 36/12 |
| 2002/0191556 | A1* | 12/2002 | Krishnarajah | H04W 28/06 370/329 |
| 2010/0103845 | A1* | 4/2010 | Ulupinar | H04L 29/12207 370/254 |
| 2011/0194535 | A1* | 8/2011 | Johansson | H04W 28/24 370/331 |
| 2011/0256872 | A1* | 10/2011 | Xu | H04W 36/08 455/436 |
| 2011/0268086 | A1* | 11/2011 | Liang | H04W 36/0055 370/331 |
| 2012/0122459 | A1* | 5/2012 | Wu | H04W 36/0022 455/437 |
| 2012/0134340 | A1 | 5/2012 | Lei | |
| 2012/0176891 | A1* | 7/2012 | Chin | H04W 36/0055 370/221 |
| 2014/0051415 | A1* | 2/2014 | Ekici | H04W 76/27 455/418 |
| 2014/0051443 | A1 | 2/2014 | Diachina et al. | |
| 2014/0051454 | A1* | 2/2014 | Wirtanen | H04W 76/27 455/452.1 |
| 2015/0282011 | A1* | 10/2015 | Watfa | H04W 36/0022 370/332 |
| 2015/0296420 | A1* | 10/2015 | Drevon | H04W 36/0022 455/436 |
| 2016/0100337 | A1 | 4/2016 | Wu et al. | |
| 2016/0286440 | A1* | 9/2016 | Zhu | H04W 36/0066 |
| 2016/0295476 | A1* | 10/2016 | Bi | H04W 36/12 |
| 2016/0366619 | A1* | 12/2016 | Yang | H04W 36/0016 |
| 2017/0078926 | A1* | 3/2017 | Zhu | H04W 36/0022 |
| 2018/0368028 | A1* | 12/2018 | Mufti | H04W 40/36 |

FOREIGN PATENT DOCUMENTS

| | | | | |
|---|---|---|---|---|
| CN | 103702393 A | 4/2014 | | |
| CN | 104137608 A | 11/2014 | | |
| CN | 104380799 A | 2/2015 | | |
| EP | 2999265 A1 | 3/2016 | | |
| EP | 3001727 A1 | 3/2016 | | |
| WO | WO-2010048574 A2 | * 4/2010 | ....... | H04L 29/12207 |
| WO | WO-2010048574 A3 | * 6/2010 | ....... | H04L 29/12207 |
| WO | 2014198043 A1 | 12/2014 | | |
| WO | 2014198048 A1 | 12/2014 | | |

OTHER PUBLICATIONS

3rd Generation Partnership Project, Technical Specification Group Services and System Aspects; General Packet Radio Service (GPRS) enhancements for Evolved Universal Terrestrial Radio Access Network (E-UTRAN) access; 3GPP, Version 13.2.0, Release 13 (Year: 2015).*

"3rd Generation Partnership Project; Technical Specification Group Services and System Aspects; General Packet Radio Service (GPRS) enhancements for Evolved Universal Terrestrial Radio Access Network (E-UTRAN) access (Release 13)"; 3GPP TS 23.401 V13.2.0; Mar. 2015; 313 pages.

"3rd Generation Partnership Project; Technical Specification Group Radio Access Network; Evolved Universal Terrestrial Radio Access Network (E-UTRAN); S1 Application Protocol (S1AP) (Release 12)"; 3GPP TS 36.413 V12.5.0; Mar. 2015; 301 pages.

* cited by examiner

CIRCUIT SWITCHED FALLBACK METHOD, NETWORK DEVICE, AND SYSTEM

CROSS-REFERENCE TO RELATED APPLICATIONS

This application is a continuation of International Application No. PCT/CN2015/078247, filed on May 5, 2015, the disclosure of which is hereby incorporated by reference in its entirety.

TECHNICAL FIELD

Embodiments of the present application relate to the communications field, and in particular, to a circuit switched fallback method, a network device, and a system.

BACKGROUND

Of current communications networks, second-generation (2G) networks such as Global System for Mobile Communications (GSM) networks, and third-generation (3G) networks such as Wideband Code Division Multiple Access (WCDMA) networks have separately provided full coverage. As network technologies of Long Term Evolution (LTE) develop, LTE networks have begun to cover traffic hot spot regions, and coexist with the GSM networks or the WCDMA networks.

When initiating or performing a circuit switched (CS) service, user equipment (UE) on an LTE network may fallback from the LTE network to a 2G network or a 3G network to continue to complete processing of the CS service. This technology is also referred to as circuit switched fallback (CSFB), and enables a network device on a 2G network or a 3G network to be reused to provide a conventional CS service for UE on an LTE network. UE may choose to fall back from an LTE network to a 2G network or a 3G network in multiple manners, for example, a redirection-based manner, a PS handover-based manner, or a single radio voice call continuity (SRVCC) handover-based manner.

When a serving cell of UE is handed over on an LTE network, the UE needs to exchange signaling with a network device such as an MME or an eNodeB for multiple times. In the prior art, if UE initiates, in a serving cell handover process, a voice service and triggers a network device such as an MME or an eNodeB to implement CSFB, the network device chooses to implement the serving cell handover process. As a result, the voice service initiated by the UE cannot be successfully established.

SUMMARY

In view of this, embodiments of the present disclosure provide a CSFB method, a network device, and a system, so as to improve a success rate of establishing a CS service when CSFB triggered by the CS service initiated by UE conflicts with a serving cell handover process of the UE.

According to a first aspect, an embodiment of the present disclosure provides a circuit switched fallback CSFB method. The method is applied to a network device on a first network, and the method includes:

determining, by the network device, that a serving cell handover process of user equipment UE is ended;

determining, by the network device, that before the serving cell handover process of the UE is ended, it has been determined that the UE needs to be moved to a second network, where the second network is a network that supports a circuit switched service; and moving, by the network device, the UE to the second network.

In a first possible implementation of the first aspect, a source serving cell of the UE is a first cell, the network device is an access network control device, and the determining, by the network device, that a serving cell handover process of UE is ended includes:

determining, by the network device according to an access message sent in a second cell by the UE, that the serving cell handover process of the UE is ended, where both the second cell and the first cell are cells managed by the network device; or determining, by the network device according to a path switching response message sent by a core network device, that the serving cell handover process of the UE is ended, where the path switching response message is sent by the core network device after the core network device receives a path switching request message sent by the network device, and the path switching request message indicates that a serving cell of the UE is a second cell.

With reference to the first possible implementation of the first aspect, in a second possible implementation, the determining, by the network device, that before the serving cell handover process of the UE is ended, it has been determined that the UE needs to be moved to a second network includes:

determining, by the network device, that before the serving cell handover process of the UE is ended, the network device has received a UE context update request message or an initial UE context setup request message that is sent by the core network device, where the UE context update request message or the initial UE context setup request message includes circuit switched fallback indication information, and the UE context update request message or the initial UE context setup request message is used to instruct the network device to move the UE to the second network; and determining, by the network device according to the UE context update request message or the initial UE context setup request message that is sent by the core network device, that the UE needs to be moved to the second network.

With reference to the second possible implementation of the first aspect, in a third possible implementation, the UE context update request message or the initial UE context setup request message further includes single radio voice call continuity SRVCC-based enhanced circuit switched fallback eCSFB operation possible information.

With reference to any one of the second possible implementation or the third possible implementation of the first aspect, in a fourth possible implementation, before the moving, by the network device, the UE to the second network, the method further includes:

sending, by the network device, a UE context update response message or an initial UE context setup response message to the core network device.

With reference to any one of the first to the fourth possible implementations of the first aspect, in a fifth possible implementation, the moving, by the network device, the UE to the second network includes:

sending, by the network device, a radio resource control connection release message to the UE, where the radio resource control connection release message is used to trigger redirection-based CSFB or inter-system cell change-based CSFB of the UE; or sending, by the network device, a handover request message to the core network device, where the handover request message is used to trigger packet service handover-based CSFB or SRVCC-based eCSFB of the UE.

With reference to any one of the first to the fifth possible implementations of the first aspect, in a sixth possible implementation, the network device is an evolved base station, the first network is a Long Term Evolution network, and the second network is a second-generation network or a third-generation network.

In a seventh possible implementation of the first aspect, the network device is a core network device, and the determining, by the network device, that a serving cell handover process of UE is ended includes:

determining, by the network device according to a location report message sent by an access network control device, that the serving cell handover process of the UE is ended, where the location report message is sent by the access network control device to the network device after the access network control device determines that a location of the UE changes from a first cell to a second cell, and both the first cell and the second cell are cells managed by the access network control device; and the determining, by the network device, that before the serving cell handover process of the UE is ended, it has been determined that the UE needs to be moved to a second network includes:

determining, by the network device, that before the network device receives the location report message, the network device has received an extended service request message of the UE; and determining, by the network device according to the extended service request message, that the UE needs to be moved to the second network.

In an eighth possible implementation of the first aspect, a source serving cell of the UE is a first cell, the network device is a core network device, and the determining, by the network device, that a serving cell handover process of UE is ended includes:

determining, by the network device according to a bearer update response message or a bearer setup response message that is sent by a serving gateway, that the serving cell handover process of the UE is ended, where the bearer update response message or the bearer setup response message is a response message that is sent by the serving gateway to respond to a bearer update request or a bearer setup request that is sent by the network device, the bearer update request or the bearer setup request is sent by the network device to the serving gateway when the network device receives a path switching request message or a handover completion message that is sent by an access network control device, and the path switching request message or the handover completion message indicates that a serving cell is a second cell; and the determining, by the network device, that before the serving cell handover process of the UE is ended, it has been determined that the UE needs to be moved to a second network includes:

determining, by the network device, that before the network device receives the bearer update/setup response message, the network device has received an extended service request message of the UE; and determining, by the network device according to the extended service request message, that the UE needs to be moved to the second network.

With reference to any one of the seventh possible implementation or the eighth possible implementation of the first aspect, in a ninth possible implementation, the moving, by the network device, the UE to the second network includes:

sending, by the network device, a UE context update request message or an initial UE context setup request message to the access network control device, where the UE context update request message or the initial UE context setup request message includes circuit switched fallback indication information, and the UE context update request message or the initial UE context setup request message is used to instruct the access network control device to move the UE to the second network.

With reference to the ninth possible implementation of the first aspect, in a tenth possible implementation, before the moving, by the network device, the UE to the second network, the method includes:

determining, by the network device, that the UE supports single radio voice call continuity SRVCC-based enhanced circuit switched fallback eCSFB, where the UE context update request message or the initial UE context setup request message further includes SRVCC-based eCSFB operation possible information.

With reference to the tenth possible implementation of the first aspect, in an eleventh possible implementation, the determining, by the network device, that the UE supports SRVCC-based eCSFB includes:

determining, by the network device according to an attach request message or a tracking area update request message of the UE, that the UE supports SRVCC-based eCSFB; or obtaining, by the network device, identification information of the UE, where the identification information of the UE includes at least one of the following: an international mobile equipment identity IMEI or an international mobile subscriber identity IMSI; and determining, by the network device according to the identification information of the UE, that the UE supports SRVCC-based eCSFB.

With reference to any one of the foregoing possible implementations of the first aspect, in a twelfth possible implementation, the network device is a mobility management entity, the access network control device is an evolved base station, the second network is a second-generation network or a third-generation network, and the first network is a Long Term Evolution network.

According to a second aspect, an embodiment of the present disclosure provides a network device. The network device includes:

a first determining unit, configured to determine that a serving cell handover process of user equipment UE is ended;

a second determining unit, configured to: before the first determining unit determines that the serving cell handover process of the UE is ended, determine that the UE needs to be moved to a second network, where the second network is a network that supports a circuit switched service; and a moving unit, configured to move the UE to the second network according to a determining result of the second determining unit.

In a first possible implementation of the second aspect, a source serving cell of the UE is a first cell, and the network device is an access network control device;

the first determining unit is specifically configured to determine, according to an access message sent in a second cell by the UE, that the serving cell handover process of the UE is ended, where both the second cell and the first cell are cells managed by the network device; or the first determining unit is specifically configured to determine, according to a path switching response message sent by a core network device, that the serving cell handover process of the UE is ended, where the path switching response message is sent by the core network device after the core network device receives a path switching request message sent by the network device, and the path switching request message indicates that a serving cell of the UE is a second cell.

With reference to the first possible implementation of the second aspect, in a second possible implementation, the second determining unit is specifically configured to determine that before the first determining unit determines that the serving cell handover process of the UE is ended, a UE context update request message or an initial UE context setup request message that is sent by the core network device has been received, where the UE context update request message or the initial UE context setup request message includes circuit switched fallback indication information, and the UE context update request message or the initial UE context setup request message is used to instruct the network device to move the UE to the second network; and the second determining unit determines, according to the UE context update request message or the initial UE context setup request message that is sent by the core network device, that the UE needs to be moved to the second network.

With reference to the second possible implementation of the second aspect, in a third possible implementation, the UE context update request message or the initial UE context setup request message further includes single radio voice call continuity SRVCC-based enhanced circuit switched fallback eCSFB operation possible information.

With reference to any one of the first possible implementation or the second possible implementation of the second aspect, in a fourth possible implementation, the network device further includes:

a responding unit, configured to send a UE context update response message or an initial UE context setup response message to the core network device.

With reference to any one of the first to the fourth possible implementations of the second aspect, in a fifth possible implementation, the moving unit is specifically configured to send a radio resource control connection release message to the UE, where the radio resource control connection release message is used to trigger redirection-based CSFB or inter-system cell change-based CSFB of the UE; or the moving unit is specifically configured to send a handover request message to the core network device, where the handover request message is used to trigger packet service handover-based CSFB or SRVCC-based CSFB of the UE.

With reference to any one of the first to the fifth possible implementations of the second aspect, in a sixth possible implementation, the network device is an evolved base station, the first network is a Long Term Evolution network, and the second network is a second-generation network or a third-generation network.

In a seventh possible implementation of the second aspect, the network device is a core network device;

the first determining unit is specifically configured to receive a location report message sent by an access network control device; and the first determining unit determines, according to the location report message, that the serving cell handover process of the UE is ended, where the location report message is sent by the access network control device to the network device after the access network control device determines that a location of the UE changes from a first cell to a second cell, and both the first cell and the second cell are cells managed by the access network control device; and the second determining unit is specifically configured to determine that before the first determining unit receives the location report message, an extended service request message of the UE has been received, and the second determining unit determines, according to the extended service request message, that the UE needs to be moved to the second network.

In an eighth possible implementation of the second aspect, a source serving cell of the UE is a first cell, and the network device is a core network device;

the first determining unit is specifically configured to receive a bearer update response message or a bearer setup response message that is sent by a serving gateway, where the bearer update response message or the bearer setup response message is a response message that is sent by the serving gateway to respond to a bearer update request or a bearer setup request that is sent by the network device, the bearer update request or the bearer setup request is sent by the network device to the serving gateway when the network device receives a path switching request message or a handover completion message that is sent by an access network control device, and the path switching request message or the handover completion message indicates that a serving cell is a second cell;

the first determining unit determines, according to the bearer update response message or the bearer setup response message, that the serving cell handover process of the UE is ended;

the second determining unit determines that before the first determining unit receives the bearer update response message or the bearer setup response message, an extended service request message of the UE has been received; and the second determining unit determines, according to the extended service request message, that the UE needs to be moved to the second network.

With reference to any one of the seventh possible implementation or the eighth possible implementation of the second aspect, in a ninth possible implementation, the moving unit is specifically configured to send a UE context update request message or an initial UE context setup request message to the access network control device, where the UE context update request message or the initial UE context setup request message includes circuit switched fallback indication information, and the UE context update request message or the initial UE context setup request message is used to instruct the access network control device to move the UE to the second network.

With reference to the ninth possible implementation of the second aspect, in a tenth possible implementation, the network device further includes a third determining unit, configured to determine that the UE supports single radio voice call continuity SRVCC-based enhanced circuit switched fallback eCSFB; and the UE context update request message or the initial UE context setup request message further includes SRVCC-based eCSFB operation possible information.

With reference to the tenth possible implementation of the second aspect, in an eleventh possible implementation, the third determining unit is specifically configured to determine, according to an attach request message or a tracking area update request message of the UE, that the UE supports SRVCC-based eCSFB; or the third determining unit obtains identification information of the UE, where the identification information of the UE includes at least one of the following: an international mobile equipment identity IMEI or an international mobile subscriber identity IMSI; and the third determining unit determines, according to the identification information of the UE, that the UE supports SRVCC-based eCSFB.

With reference to any one of the foregoing implementations of the second aspect, in a twelfth possible implementation, the network device is a mobility management entity, the access network control device is an evolved base station, the second network is a second-generation network or a third-generation network, and the first network is a Long Term Evolution network.

According to a third aspect, an embodiment of the present disclosure provides a circuit switched fallback system. The system includes:

at least one user equipment UE; and the network device according to any possible implementation of the second aspect.

According to the method, the device, and the system in the embodiments of the present disclosure, when CSFB triggered by a CS service initiated by UE conflicts with a serving cell handover process of the UE, after completing the serving cell handover process of the UE, the UE may be moved to a network supporting the CS service, so that the CS service of the UE can continue to be performed. In this way, a success rate of establishing the CS service is increased.

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

A method and an apparatus in the embodiments of the present disclosure may be implemented by a network device. The network device includes any one or more than one of the following devices: an access network control device or a core network device. However, this constitutes no limitation. The access network control device herein may be an evolved base station (eNodeB), a wireless network controller, a base station, or the like. The core network device may be a mobility management entity (MME) or the like. In the embodiments of the present disclosure, for the network device, a user and user equipment have same meaning.

Figure 1:
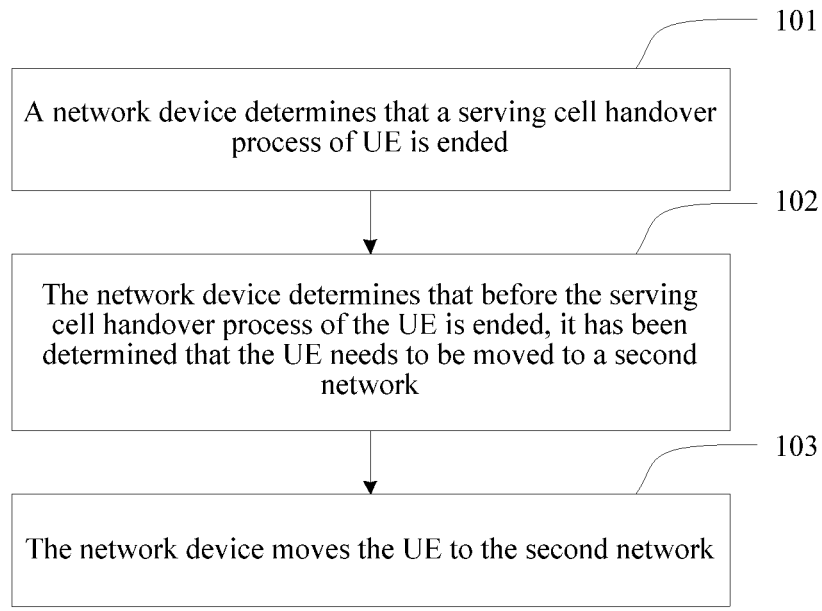
FIG. 1 is a flowchart of a circuit switched fallback method according to an embodiment of the present disclosure.

FIG. 1 is a flowchart of a circuit switched fallback method according to an embodiment of the present disclosure. The method may be applied to a network device on a first network. As shown in FIG. 1, the method includes the following steps.

101: A network device determines that a serving cell handover process of UE is ended.

When the UE is in a connected mode, the UE may hand over between different cells. In this way, a serving cell changes, so that a location of the UE changes. For example, for the UE, before handover, a source serving cell is a first cell, and a destination serving cell is a second cell. In this case, the serving cell is the second cell after handover is completed.

In an embodiment of the present disclosure, the network device may be an access network control device, for example, an eNodeB, and the eNodeB manages the second cell. If the source serving cell of the UE is the first cell, and the first cell is also managed by the eNodeB, after completion of handover, the eNodeB receives an access message such as a handover completion message or a handover acknowledgment message that is sent in the second cell by the UE, and the eNodeB may determine that the serving cell handover process of the UE is ended. If the first cell is managed by another access network control device, and there is an X2 interface between the two eNodeBs, after receiving the access message that is sent in the second cell by the UE, the eNodeB further needs to send a path switching request message to an MME to instruct a user plane bearer to be handed over. After receiving a path switching response message that is sent by the MME according to the path switching request message, the eNodeB determines that the serving cell handover process of the UE is ended.

In another embodiment of the present disclosure, the network device may alternatively be a core network device, for example, an MME. The MME may determine in multiple manners that the serving cell handover process of the UE is ended. For example, the MME receives a location report message sent by an access network control device, for example, an eNodeB. The location report message may indicate a location identifier of the UE, for example, a cell identifier or a tracking area identifier. The MME may determine, according to the location identifier of the UE in the received location report message, that the serving cell handover process of the UE is ended. For example, if the source serving cell of the UE is the first cell, and the location report message received by the MME indicates that a cell identifier of the serving cell of the UE is the second cell, that is, the location report message is sent by the eNodeB to the MME after the eNodeB determines that the serving cell of the UE is handed over to the second cell, the MME may determine that the serving cell change process of the UE is ended. Both the first cell and the second cell herein are cells managed by the eNodeB. For another example, if the location report message indicates that a tracking area identifier of the UE changes, the network device may determine that the serving cell handover process of the UE is ended. It should be noted that these are only examples, and this embodiment of the present disclosure is not limited thereto. In an embodiment of the present disclosure, to obtain in a timely manner a location report of the UE that is sent by the access network control device, the core network device may send a location subscription message to the access network control device to subscribe to change information of the serving cell of the UE. In this way, when the serving cell of the UE changes, the core network device receives the location report message sent by the access network control device.

For another example, the source serving cell of the UE is the first cell, and the core network device receives a bearer update response message or a bearer setup response message that is sent by a serving gateway. The bearer update response message or the bearer setup response message is a response message that is sent by the serving gateway to respond to a bearer update request or a bearer setup request that is sent by the core network device, the bearer update request or the bearer setup request message is sent by the core network device to the serving gateway when the core network device receives a path switching request message or a handover completion message that is sent by an access network control device, and the path switching request message indicates that a serving cell is a second cell. The core network device may determine, according to the bearer update response message or the bearer setup response message, that the serving cell handover process of the UE is ended. It should be noted that, all the foregoing descriptions are only examples, and this embodiment of the present disclosure is not limited thereto.

102: The network device determines that before step 101, it has been determined that the UE needs to be moved to a second network, where the second network is a network that supports a circuit switched service.

When the UE initiates a CS service on a first network, for example, initiates calling in a voice service or is called in a voice service, the UE sends an extended service request message to the core network device and indicates, in the message, that a calling CSFB service or a called CSFB service needs to be performed. After receiving the extended service request message, the core network device determines that because of CSFB, the UE needs to be moved to the second network that supports a CS service, and sends a UE context update message or an initial UE context setup request message to the access network control device. The UE context update message or the initial UE context setup request message may include circuit switched fallback indication information, to instruct the access network control device to move the UE to the second network that supports a CS service, and may further include SRVCC-based enhanced circuit switched fallback eCSFB operation possible information, to instruct the access network control device to perform a CSFB operation in a SRVCC-based manner. Certainly, the UE context update message or the initial UE context setup request message may further include air interface capability information of the UE, so that the access network control device conveniently determines a manner for performing CSFB. The access network control device determines, according to the UE context update request message or the initial UE context setup request message that is sent by the core network device, that the UE needs to be moved to the second network.

When the serving cell of the UE changes, the core network device and the access network control device need to exchange signaling for multiple times. The UE may initiate a CS service before serving cell handover, or initiate a CS service during serving cell handover.

The network device is, for example, an access network control device. If the UE context update request message or the initial UE context setup request message that is sent by the core network device is received before the serving cell handover process of the UE is ended, where the UE context update request message or the initial UE context setup request message includes circuit switched fallback indication information, to instruct the access network control device to move the UE to the second network that supports a circuit switched domain, the access network control device determines that before step 101, it has been determined that the UE needs to be moved to the second network.

The network device is, for example, a core network device. If an extended service request message of the UE is received before the serving cell handover process of the UE is ended, to request to establish a CS service, the core network device determines that before step 101, it has been determined that the UE needs to be moved to the second network.

103: The network device moves the UE to the second network.

The network device may move the UE to the second network in multiple manners.

In an embodiment of the present disclosure, the network device is, for example, an MME. The MME sends a UE context update request message or an initial UE context setup request message to the access network control device, for example, an eNodeB, and adds circuit switched fallback indication information to the message. The eNodeB moves the UE to the second network according to the circuit switched fallback indication information. Further, before step 103, if the MME determines that the UE supports SRVCC handover, the MME may further add SRVCC-based eCSFB operation possible information to the UE context update request message or the initial UE context setup request message, so that the eNodeB may move the UE to the second network by means of SRVCC-based CSFB according to the indication information. Certainly, the UE context update message or the initial UE context setup request message may further include air interface capability information of the UE, so that the access network control device conveniently determines a manner for performing CSFB. The MME may determine, according to an attach request message or a tracking area update request message of the UE, that the UE supports SRVCC handover. Alternatively, the MME may obtain identification information of the UE, and determine, according to the identification information of the UE, that the UE supports SRVCC handover. The identification information of the UE includes at least one of the following: an international mobile equipment identity IMEI or an international mobile subscriber identity IMSI. It should be noted that, all the foregoing descriptions are only examples, and this embodiment of the present disclosure is not limited thereto.

In an embodiment of the present disclosure, the network device is, for example, an eNodeB. The eNodeB may send a radio resource control connection release message to the UE, and add different CSFB indication information to the radio resource control connection release message to trigger redirection-based CSFB or inter-system cell change-based CSFB, to move the UE to the second network that supports a CS service. Alternatively, the eNodeB may send a handover request message to the core network device, for example, an MME, and add different CSFB information to the handover request message to trigger packet service handover-based CSFB or SRVCC-based eCSFB.

In an embodiment of the present disclosure, the first network may be an LTE network, the access network control device is an eNodeB, the core network device is an MME, and correspondingly, the second network may be a GSM network or a WCDMA network. It should be noted that, the foregoing descriptions are only examples, and this embodiment of the present disclosure is not limited thereto.

According to the method in this embodiment of the present disclosure, when CSFB triggered by a CS service initiated by UE conflicts with a serving cell handover process of the UE, a network device may move, after completing the serving cell handover process of the UE, the UE to a network supporting the CS service, so that the CS service of the UE can continue to be performed. In this way, a success rate of establishing the CS service is increased.

Figure 2:
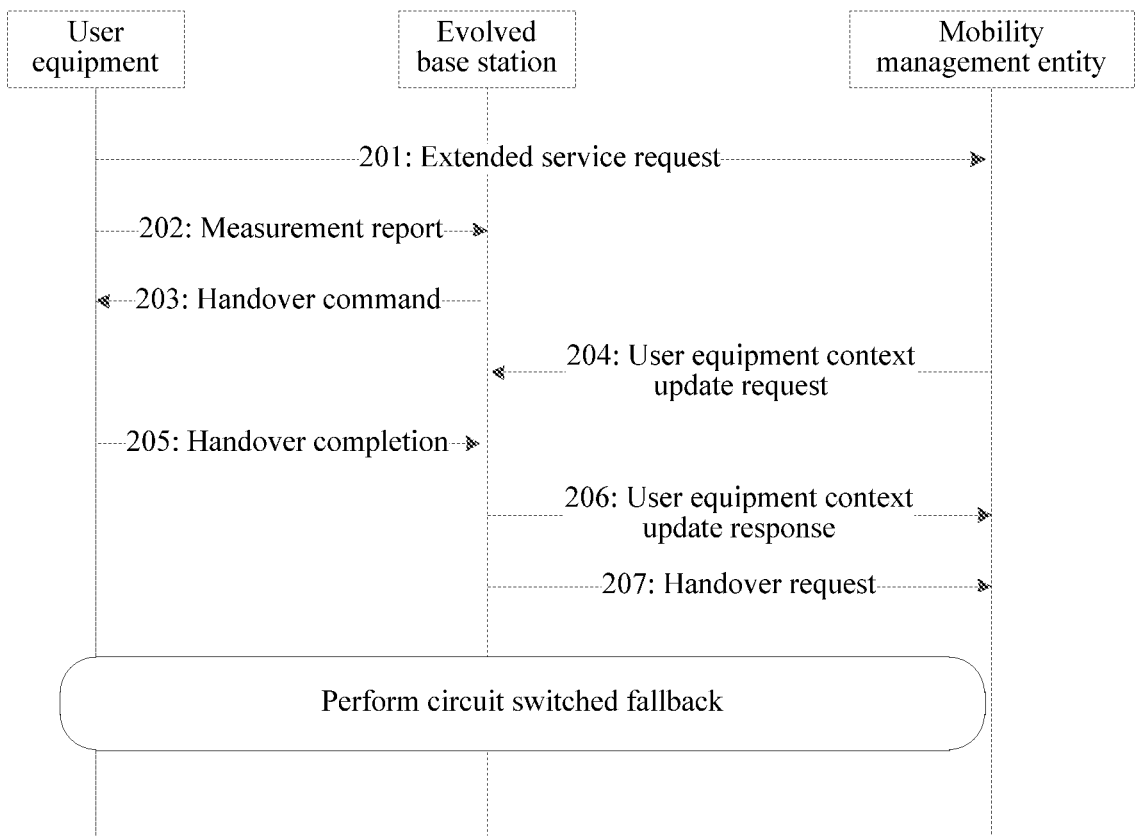
FIG. 2 is a flowchart of a circuit switched fallback method according to another embodiment of the present disclosure.

FIG. 2 is a flowchart of a circuit switched fallback method according to another embodiment of the present disclosure. In this embodiment of the present disclosure, for ease of description, for example, a first network is an LTE network, a network device is an eNodeB, and a second network is a third-generation network, for example, a WCDMA network. It can be understood that the present disclosure is not limited thereto. As shown in FIG. 2, the method includes the following steps.

201: UE sends, in a first cell, an extended service request message to an MME.

When the UE is in an idle state and camps on the first cell, if the UE needs to initiate a CS service, for example, the UE needs to initiate calling in a voice service or the UE is called in a voice service, the UE establishes a connection in the first cell by using the eNodeB, and sends the extended service request message to the MME.

When the UE is in a connected mode and a source serving cell is the first cell managed by the eNodeB, if the UE needs to initiate a CS service, for example, the UE initiates calling in a voice service or the UE is called in a voice service, the UE sends, in the first cell, the extended service request message to the MME by using the eNodeB.

202: The UE sends, in the first cell, a measurement report message to an eNodeB.

Because the UE continuously measures the first cell and a neighboring cell of the first cell, the UE sends, in the first cell, the measurement report message to the eNodeB. The measurement report message may include signal quality information of the neighboring cell of the first cell, for example, signal quality information of a second cell managed by the eNodeB.

203: The eNodeB sends a handover command message to the UE to instruct the UE to be handed over to a second cell.

The eNodeB may determine, according to the measurement report message received in step 202, that the UE is to be handed over to the second cell. If, for example, signal quality of the second cell is greater than a preset handover threshold, or for another example, signal quality of the second cell is better than signal quality of the first cell, the eNodeB determines that the UE is to be handed over to the second cell, and sends the handover command message to the UE to instruct the UE to be handed over to the second cell. It should be noted that all the foregoing descriptions are only examples for ease of description, and this embodiment of the present disclosure is not limited thereto.

It should be noted that, step 201 may alternatively be performed after step 202 or step 203, and this embodiment of the present disclosure is not limited thereto.

204: The eNodeB receives a UE context update message or an initial UE context setup request message that is sent by the MME.

The MME triggers CSFB to move the UE to a WCDMA network according to the extended service request message received in step 201. The eNodeB receives the UE context update message or the initial UE context setup request message that is sent by the MME, where the UE context update message or the initial UE context setup request message includes circuit switched fallback indication information, so that the eNodeB may determine, according to the UE context update message or the initial UE context setup request message, that the UE needs to be moved to the second network.

Further, the UE context update message or the initial UE context setup request message may further include SRVCC-based eCSFB operation possible information, so that the eNodeB may determine, according to the SRVCC-based eCSFB operation possible information, that the UE needs to be moved to the second network in an SRVCC handover-based manner. Certainly, the UE context update message or the initial UE context setup message may further include air interface capability information of the UE, so that the eNodeB may determine, according to the information, to move the UE to the second network in a suitable manner.

Because the eNodeB and the UE are now still in a handover process, the eNodeB cannot immediately process circuit switched fallback of the UE, and the eNodeB may record information that the UE needs to perform circuit switched fallback. For example, the eNodeB may buffer the received UE context update message or the received initial UE context setup request message. For another example, the eNodeB may alternatively buffer information that includes but is not limited to the following information: a circuit switched fallback operation state, supported circuit switched fallback indication information, a UE context, and the like. It should be noted that, only an example is used herein, and this embodiment of the present disclosure is not limited thereto.

205: The eNodeB receives a handover completion message or a handover acknowledgment message that is sent in the second cell by the UE.

Because the eNodeB and the UE are already in a handover process in steps 202 and 203, after the UE completes serving cell handover, the UE sends the handover completion message or the handover acknowledgment message in the second cell. The eNodeB determines, according to the received handover completion message or the received handover acknowledgment message that is sent in the second cell by the UE, that the serving cell of the UE changes from the first cell to the second cell.

206: The eNodeB sends a UE context update response message or an initial UE context setup response message to the MME.

The eNodeB determines, according to step 204, that the UE needs to be moved to the second network, and sends a UE context update response message or an initial UE context setup response message to the MME, to notify the MME that a UE context is updated successfully or set up successfully. For example, the eNodeB receives, in step 204, the UE context update message sent by the MME, and the eNodeB may send the UE context update response message to the MME. For another example, the eNodeB receives, in step 204, the initial UE context setup request message sent by the MME, and the eNodeB may send the initial UE context setup response message to the MME.

It should be noted that step 206 may be performed before 205, or may be performed after step 205, and this embodiment of the present disclosure imposes no limitation. When step 206 is performed after step 205, because the eNodeB has recorded the information that the UE needs to perform circuit switched fallback, the eNodeB may send the UE context update response message or the initial UE context setup response message to the MME according to the recorded information that the UE needs to perform circuit switched fallback.

207: The eNodeB sends a handover request message to the MME.

Because it is determined in step 204 that the UE needs to be moved to the second network, the eNodeB records the information that the UE needs to perform circuit switched fallback. In this way, after step 205, the eNodeB sends the handover request message to the MME according to the information, to trigger packet service handover-based CSFB or SRVCC-based CSFB of the UE to move the UE to the second network. After the UE is moved to the second network, the CS service is initiated and performed on the second network that supports a CS service.

Certainly, in step 207, the eNodeB may alternatively trigger a CSFB procedure of the UE in another manner to move the UE to the second network. This has been described in step 103 of the foregoing method, and details are not described herein again.

According to the method in this embodiment of the present disclosure, when CSFB triggered by a CS service initiated by UE conflicts with a serving cell handover process of the UE, an eNodeB may move, after completing the serving cell handover process of the UE, the UE to a network supporting the CS service, so that the CS service of the UE can continue to be performed. In this way, a success rate of establishing the CS service is increased.

Figure 3:
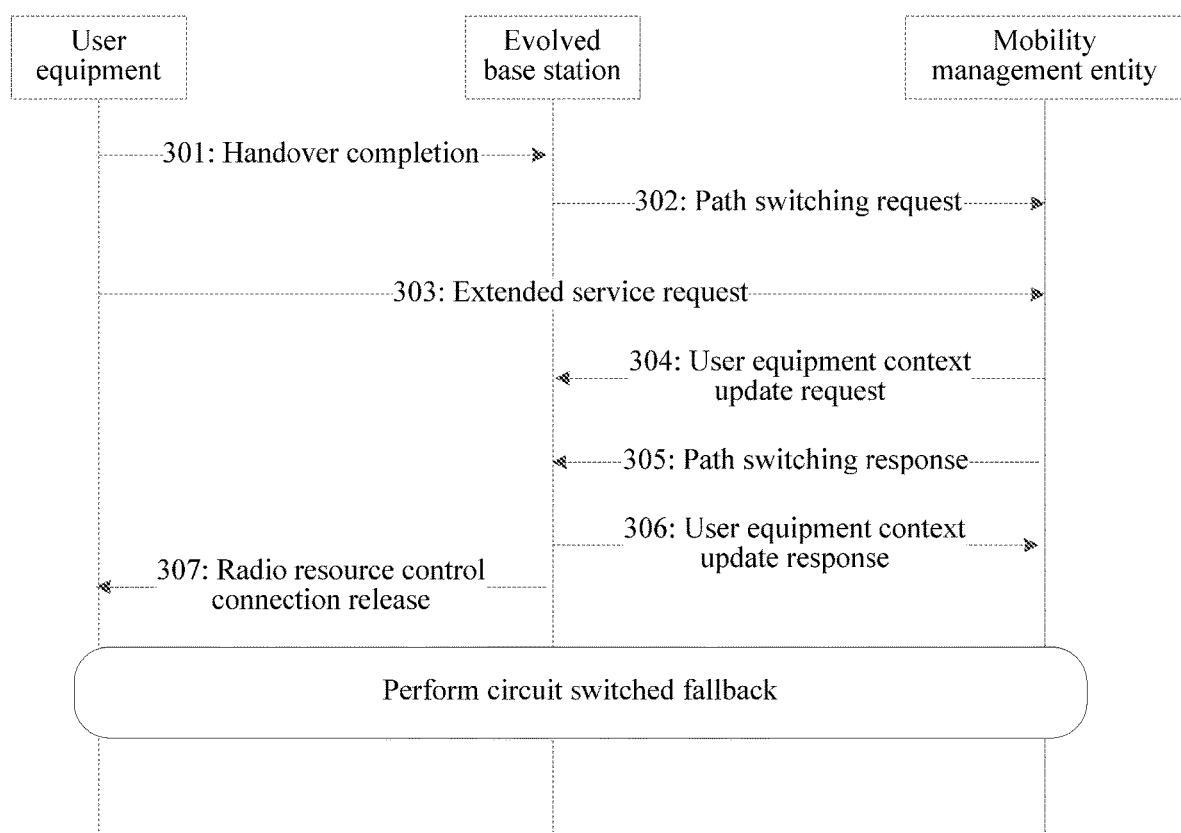
FIG. 3 is a flowchart of a circuit switched fallback method according to another embodiment of the present disclosure.

FIG. 3 is a flowchart of a circuit switched fallback method according to another embodiment of the present disclosure. In this embodiment of the present disclosure, for ease of description, for example, a first network is an LTE network, a network device is an eNodeB1 and an eNodeB2, and a second network is a third-generation network, for example, a WCDMA network. It can be understood that the present disclosure is not limited thereto. As shown in FIG. 3, the method includes the following steps.

301: The eNodeB2 receives a handover completion message or a handover acknowledgment message that is sent in a second cell by UE.

When the UE is handed over from a first cell managed by the eNodeB1 to the second cell managed by the eNodeB2, the eNodeB1 initiates an X2 interface handover process, where there is an X2 interface between the eNodeB1 and the eNodeB2. After the UE completes serving cell handover, the UE sends, in the second cell managed by the eNodeB2, the handover completion message or the handover acknowledgment message to the eNodeB2.

302: The eNodeB2 sends a path switching request message to an MME.

Because the X2 interface is handed over, the eNodeB2 sends the path switching request message to the MME to instruct a user plane bearer to be handed over.

303: The UE sends, in the second cell, an extended service request message to the MME.

If the UE needs to initiate a CS service, for example, the UE initiates calling in a voice service or the UE is called in a voice service, the UE sends, in the second cell, the extended service request message to the MME by using the eNodeB2.

304: The eNodeB2 receives a UE context update message or an initial UE context setup request message that is sent by the MME.

The MME triggers CSFB to move the UE to a WCDMA network according to the extended service request message received in step 303. The eNodeB2 receives the UE context update message or the initial UE context setup request message that is sent by the MME, where the UE context update message or the initial UE context setup request message includes circuit switched fallback indication information, so that the eNodeB2 may determine, according to the circuit switched fallback indication information, that the UE needs to be moved to the second network.

Further, the UE context update message or the initial UE context setup request message may further include SRVCC-based eCSFB operation possible information, so that the eNodeB2 may determine, according to the SRVCC-based eCSFB operation possible information, that the UE needs to be moved to the second network in an SRVCC handover-based manner. Certainly, the UE context update message or the initial UE context setup message may further include air interface capability information of the UE, so that the eNodeB may determine, according to the information, to move the UE to the second network in a suitable manner.

Because the eNodeB2 is now still in a handover process, the eNodeB2 cannot immediately process circuit switched fallback of the UE, and the eNodeB2 may record information that the UE needs to perform circuit switched fallback. For example, the eNodeB2 may buffer the received UE context update message or the received initial UE context setup request message. For another example, the eNodeB2 may alternatively buffer information that includes but is not limited to the following information: a circuit switched fallback operation state, supported circuit switched fallback indication information, a UE context, and the like. It should be noted that, only an example is used herein, and this embodiment of the present disclosure is not limited thereto.

305: The eNodeB2 receives a path switching response message sent by the MME.

After the eNodeB2 receives the path switching response message that is sent by the MME according to the path switching request message in step 302, the eNodeB2 determines that the serving cell change process of the UE is ended.

306: The eNodeB2 sends a UE context update response message or an initial UE context setup response message to the MME.

The eNodeB2 determines, according to step 304, that the UE needs to be moved to the second network, and sends the UE context update response message or the initial UE context setup response message to the MME, to notify the MME that a UE context is updated successfully or set up successfully. For example, the eNodeB2 receives, in step 304, the UE context update message sent by the MME, and the eNodeB2 may send the UE context update response message to the MME. For another example, the eNodeB2 receives, in step 304, the initial UE context setup request message sent by the MME, and the eNodeB2 may send the initial UE context setup response message to the MME.

It should be noted that step 306 may be performed before 305, or may be performed after step 305, and this embodiment of the present disclosure imposes no limitation. When step 306 is performed after step 305, because the eNodeB2 has recorded the information that the UE needs to perform circuit switched fallback, the eNodeB2 may send the UE context update response message or the initial UE context setup response message to the MME according to the recorded information that the UE needs to perform circuit switched fallback.

307: The eNodeB2 sends a radio resource control connection release message to the UE.

Because it is determined in step 304 that the UE needs to be moved to the second network, the eNodeB2 records the information that the UE needs to perform circuit switched fallback. In this way, after step 305, the eNodeB2 sends the radio resource control connection release message to the UE according to the information, and adds different CSFB information to the radio resource control connection release message to indicate whether redirection-based CSFB or inter-system cell change-based CSFB is used, to move the UE to the second network that supports a CS service. After the UE is moved to the second network, the CS service is initiated and performed on the second network that supports a CS service.

Certainly, in step 307, the eNodeB may alternatively trigger a CSFB procedure of the UE in another manner to move the UE to the second network. This has been described in step 103 of the foregoing method, and details are not described herein again.

According to the method in this embodiment of the present disclosure, when CSFB triggered by a CS service initiated by UE conflicts with a serving cell handover process of the UE, an eNodeB may move, after completing the serving cell handover process of the UE, the UE to a network supporting the CS service, so that the CS service of the UE can continue to be performed. In this way, a success rate of establishing the CS service is increased.

Figure 4:
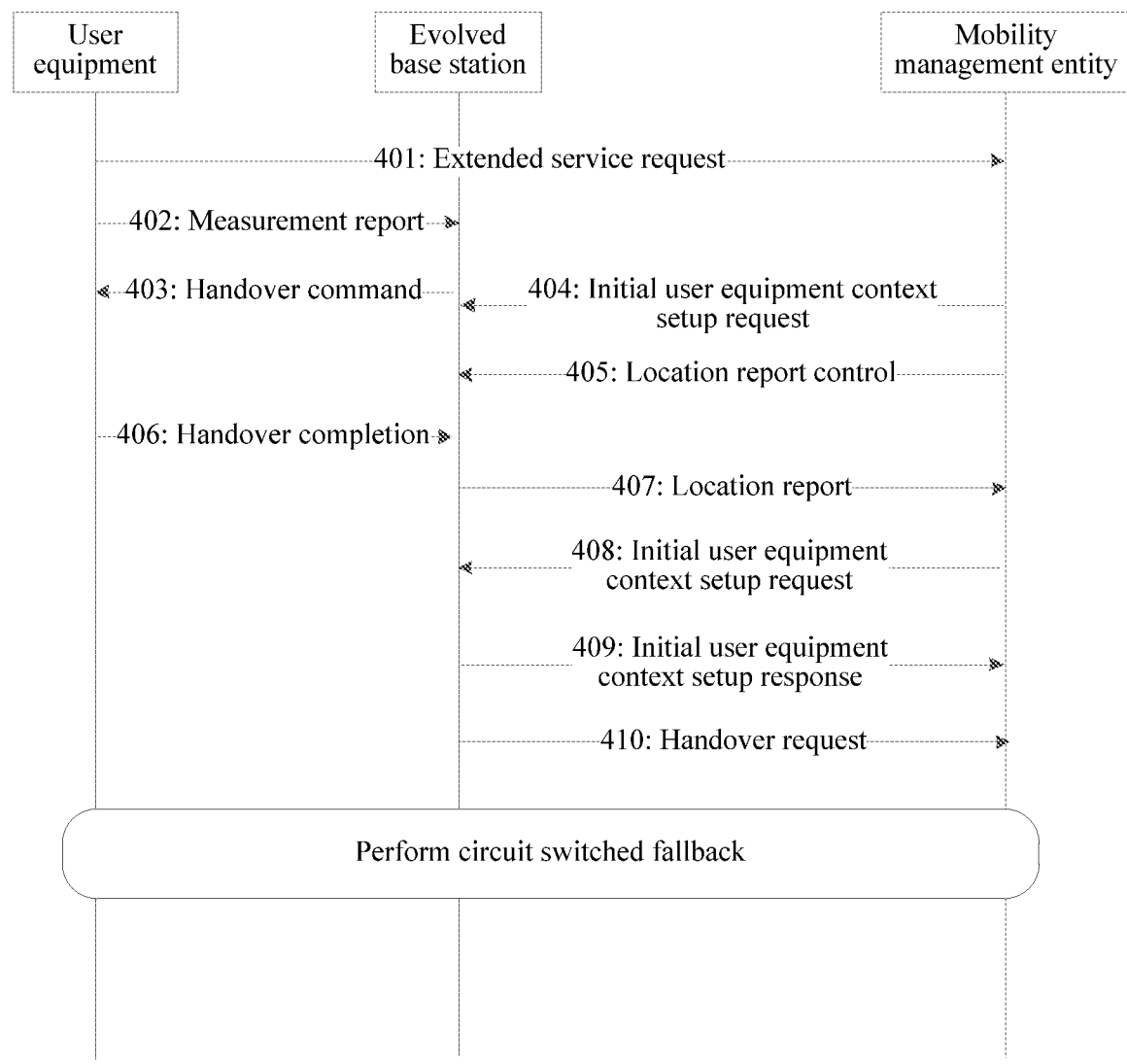
FIG. 4 is a flowchart of a circuit switched fallback method according to another embodiment of the present disclosure.

FIG. 4 is a flowchart of a circuit switched fallback method according to another embodiment of the present disclosure. In this embodiment of the present disclosure, for ease of description, for example, a first network is an LTE network, a network device is an MME, and a second network is a third-generation network, for example, a WCDMA network. It can be understood that the present disclosure is not limited thereto. As shown in FIG. 4, the method includes the following steps.

401: UE sends, in a first cell, an extended service request message to the MME.

402: The UE sends, in the first cell, a measurement report message to an eNodeB.

403: The eNodeB sends a handover command message to the UE to instruct the UE to be handed over to a second cell.

It should be noted that, for steps 401 to 403, refer to steps 201 to 203, step 401 may alternatively be performed after step 402 or step 403, and this embodiment of the present disclosure is not limited thereto.

404: The MME sends a UE context update message or an initial UE context setup request message to the eNodeB.

The MME may trigger CSFB to move the UE to a WCDMA network according to the extended service request message received in step 401. The MME determines that the UE needs to be moved to the WCDMA network, and sends the UE context update message or the initial UE context setup request message to the eNodeB, where the UE context update message or the initial UE context setup request message includes circuit switched fallback indication information, so that the eNodeB may determine, according to the circuit switched fallback indication information, that the UE needs to be moved to the second network.

Further, the MME may obtain, in multiple manners, capability indication information indicating that the UE supports SRVCC handover, and add SRVCC-based eCSFB operation possible information to the UE context update message or the initial UE context setup request message, so that the eNodeB may determine, according to the SRVCC-based eCSFB operation possible information, that the UE needs to be moved to the second network in an SRVCC handover-based manner. Certainly, the UE context update message or the initial UE context setup message may further include air interface capability information of the UE, so that the eNodeB may determine, according to the information, to move the UE to the second network in a suitable manner.

For example, the UE adds the capability indication information indicating that the UE supports SRVCC handover to an attach request message or a tracking area update message when the UE sends the attach request message or the tracking area update message. In an embodiment of the present disclosure, the MME may obtain, according to the attach request message or the tracking area update message of the UE, the capability indication information indicating that the UE supports SRVCC handover. For another example, a correspondence between identification information of the UE and that an SRVCC handover capability is supported may be stored. The identification information of the UE includes at least one of the following: an international mobile equipment identity IMEI of the UE or an international mobile subscriber identity IMSI of the UE. The MME may obtain the identification information of the UE, and obtain, according to the identification information of the UE, the capability indication information indicating that the UE supports SRVCC handover. It should be noted that, only an example is used herein for description, and the present disclosure is not limited thereto.

405: The MME sends a location report control message to the eNodeB.

The MME may send a location subscription message to the eNodeB to subscribe to serving cell change information of the UE. For example, the MME sends the location report control message to the eNodeB, to instruct the eNodeB to report location information of the UE when a serving cell of the UE changes to another cell of the eNodeB. It should be noted that, it is not limited that step 405 is performed after 404. Alternatively, the MME may send the location report control message before 401, or send the location report control message at any moment between 401 and 404. This embodiment of the present disclosure is not limited thereto.

406: The eNodeB receives a handover completion message or a handover acknowledgment message that is sent in the second cell by the UE.

407: The eNodeB sends a location report to the MME.

Because the eNodeB is in a handover process, the eNodeB cannot process the UE context update message or the initial UE context setup request message that is received in step 404. After the eNodeB determines in step 406 that the serving cell of the UE is the second cell, the eNodeB sends a location report to the MME, and adds a cell identifier of the current serving cell of the UE, that is, the second cell, to a location report message.

408: The MME sends a UE context update message or an initial UE context setup request message to the eNodeB.

The MME receives the location report message sent by the eNodeB. Because the location report message indicates that the serving cell of the UE is the second cell, the MME determines that the serving cell of the UE has changed from the first cell to the second cell. Further, because the serving cell of the UE is still on the LTE network, the MME may determine that the operation of moving the UE to the WCDMA network is unsuccessful in step 404, and the MME still needs to move the UE to the WCDMA network.

The MME sends a UE context update message or an initial UE context setup request message to the eNodeB to move the UE to the WCDMA network. For sending the UE context update message or the initial UE context setup request message by the MME, refer to step 404, and details are not described herein again.

409: The eNodeB sends a UE context update response message or an initial UE context setup response message to the MME.

The eNodeB sends the UE context update response message or the initial UE context setup response message to the MME, to notify the MME that a UE context is updated successfully or set up successfully.

410: The eNodeB sends a handover request message to the MME.

The eNodeB determines, according to the UE context update message or the initial UE context setup request message received in step 408, whether to use packet service handover-based CSFB or SRVCC-based CSFB to move the UE to the second network. The eNodeB sends the handover request message to the MME, and corresponding CSFB information is used to indicate whether to use packet service handover-based CSFB or SRVCC-based CSFB.

Certainly, in step 410, the eNodeB may alternatively trigger a CSFB procedure of the UE in another manner to move the UE to the second network. This has been described in step 103 of the foregoing method, and details are not described herein again.

Because the eNodeB and the MME still process a serving cell handover process of the UE between steps 402 and 407, the MME cannot immediately process circuit switched fallback of the UE, and the MME may record information that the UE needs to perform circuit switched fallback. For example, the MME may buffer the received UE context update message or the received initial UE context setup request message. For another example, the MME may alternatively buffer information that includes but is not limited to the following information: a circuit switched fallback operation state, supported circuit switched fallback indication information, a UE context, and the like. It should be noted that, only an example is used herein, and this embodiment of the present disclosure is not limited thereto.

According to the method in this embodiment of the present disclosure, when CSFB triggered by a CS service initiated by UE conflicts with a serving cell handover process of the UE, an MME may move, after completing the serving cell handover process of the UE, the UE to a network supporting the CS service, so that the CS service of the UE can continue to be performed. In this way, a success rate of establishing the CS service is increased.

Figure 5:
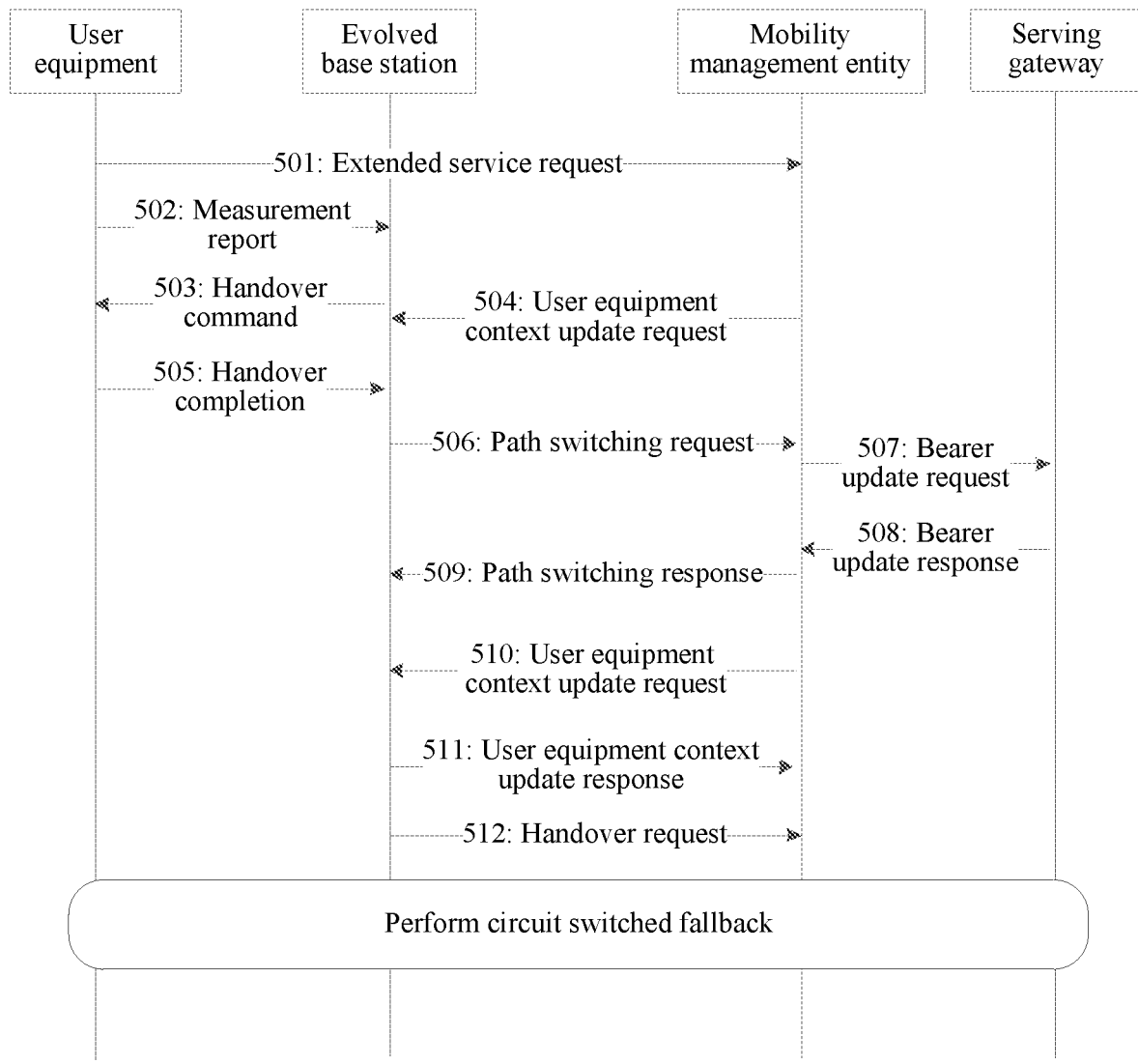
FIG. 5 is a flowchart of a circuit switched fallback method according to another embodiment of the present disclosure.

FIG. 5 is a flowchart of a circuit switched fallback method according to another embodiment of the present disclosure. In this embodiment of the present disclosure, for ease of description, for example, a first network is an LTE network, a network device is an MME, and a second network is a third-generation network, for example, a WCDMA network. It can be understood that the present disclosure is not limited thereto. A difference between this embodiment of the present disclosure and the embodiment shown in FIG. 4 lies in that a serving cell of the UE changes from a first cell managed by an eNodeB1 to a second cell managed by an eNodeB2. Because an X2 interface is handed over, the eNodeB2 sends a path switching request message to the MME to instruct a user plane bearer to be handed over. For steps 501 to 504, refer to steps 401 to 404, and details are not described herein again.

505: The eNodeB2 receives a handover completion message or a handover acknowledgment message that is sent in a second cell by UE.

506: The MME receives a path switching request message sent by the eNodeB2, to instruct a user plane bearer to be handed over.

After the eNodeB2 receives the handover completion message or the handover acknowledgment message that is sent in the second cell by the UE, because the X2 interface is handed over, the eNodeB2 sends the path switching request message to the MME.

The MME receives the path switching request message that is sent by the eNodeB2 to instruct a user plane bearer to be handed over. The path switching request message includes new location information of the UE, for example, a tracking area identifier or a serving cell identifier. The MME determines, according to the path switching request message, that a location of the UE is changing.

507: The MME sends a bearer update request or a bearer setup request message to a serving gateway.

The MME sends the bearer update request or the bearer setup request message to the serving gateway according to the path switching request message received in step 506.

508: The MME receives a bearer update response message or a bearer setup response message that is sent by the serving gateway.

The serving gateway sends the bearer update response message or the bearer setup response message according to the bearer update request or the bearer setup request message that is received in step 507. After the MME receives the bearer update response message or the bearer setup response message, the MME determines that the serving cell handover process of the UE is ended.

509: The MME sends a path switching response message to the eNodeB2.

510: The MME sends a UE context update message or an initial UE context setup request message to the eNodeB2.

Because the serving cell of the UE is still on the LTE network, the MME may determine that the operation of moving the UE to the WCDMA network is unsuccessful in step 504, and the MME still needs to move the UE to the WCDMA network.

The MME sends the UE context update message or the initial UE context setup request message to the eNodeB2 to move the UE to the WCDMA network. For sending the UE context update message or the initial UE context setup request message by the MME, refer to step 404, and details are not described herein again.

511: The eNodeB2 sends a UE context update response message or an initial UE context setup response message to the MME.

The eNodeB2 sends the UE context update response message or the initial UE context setup response message to the MME, to notify the MME that a UE context is updated successfully or set up successfully.

512: The eNodeB2 sends a handover request message to the MME.

The eNodeB2 determines, according to the UE context update message or the initial UE context setup request message received in step 510, whether to use packet service handover-based CSFB or SRVCC-based CSFB to move the UE to the second network. The eNodeB2 sends the handover request message to the MME, and corresponding CSFB information is used to indicate whether to use packet service handover-based CSFB or SRVCC-based CSFB.

Certainly, in step 512, the eNodeB2 may alternatively trigger a CSFB procedure of the UE in another manner to move the UE to the second network. This has been described in step 103 of the foregoing method, and details are not described herein again.

It should be noted that, step 501 may alternatively be performed after steps 502 to 507, and this embodiment of the present disclosure is not limited thereto.

Because the eNodeB and the MME still process a serving cell handover process of the UE between steps 502 and 507, the MME cannot immediately process circuit switched fallback of the UE, and the MME may record information that the UE needs to perform circuit switched fallback. For example, the MME may buffer the received UE context update message or the received initial UE context setup request message. For another example, the MME may alternatively buffer information that includes but is not limited to the following information: a circuit switched fallback operation state, supported circuit switched fallback indication information, a UE context, and the like. It should be noted that, only an example is used herein, and this embodiment of the present disclosure is not limited thereto.

According to the method in this embodiment of the present disclosure, when CSFB triggered by a CS service initiated by UE conflicts with a serving cell handover process of the UE, an MME may move, after completing the serving cell handover process of the UE, the UE to a network supporting the CS service, so that the CS service of the UE can continue to be performed. In this way, a success rate of establishing the CS service is increased.

Figure 6:
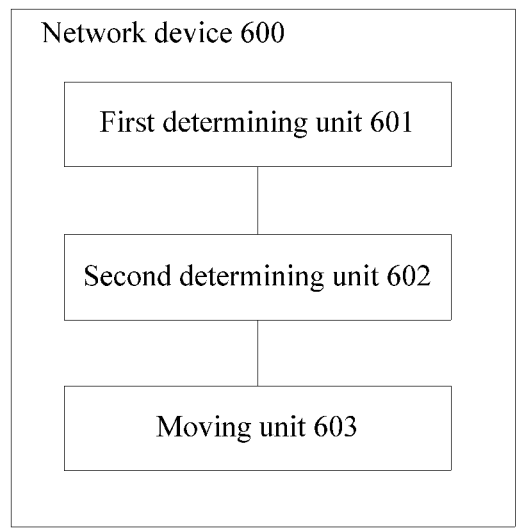
FIG. 6 is a structural diagram of a network device according to another embodiment of the present disclosure.

FIG. 6 is a structural diagram of a network device according to another embodiment of the present disclosure. The network device provided in this embodiment of the present disclosure may implement the foregoing method embodiments of the present disclosure. As shown in FIG. 6, the network device 600 includes:

a first determining unit 601, configured to determine that a serving cell handover process of UE is ended;

a second determining unit 602, configured to: before the first determining unit 601 determines that the serving cell handover process of the UE is ended, determine that the UE needs to be moved to a second network, where the second network is a network that supports a circuit switched service; and a moving unit 603, configured to move the UE to the second network according to a determining result of the second determining unit 602.

The network device is an access network control device, for example, an eNodeB, the first network is an LTE network, and the second network is a second-generation network or a third-generation network. In this case, in an embodiment of the present disclosure, the first determining unit 601 is specifically configured to determine, according to an access message sent in a second cell by the UE, that the serving cell handover process of the UE is ended, where both the second cell and the first cell are cells managed by the network device, and the first cell is a source serving cell of the UE. In another embodiment of the present disclosure, the first determining unit 601 is specifically configured to determine, according to a path switching response message sent by a core network device, that the serving cell handover process of the UE is ended, where the path switching response message is sent by the core network device after the core network device receives a path switching request message sent by the network device, the path switching request message indicates that a serving cell of the UE is a second cell, and the second cell is a cell managed by the network device.

The second determining unit 602 is specifically configured to: before the first determining unit 601 determines that the serving cell handover process of the UE is ended, determine that a UE context update request message or an initial UE context setup request message that is sent by the core network device has been received, where the UE context update request message or the initial UE context setup request message includes circuit switched fallback indication information, and the circuit switched fallback indication information is used to instruct to move the UE to the second network. The second determining unit 602 determines, according to the UE context update request message or the initial UE context setup request message that is sent by the core network device, that the UE needs to be moved to the second network. Further, the UE context update request message or the initial UE context setup request message further includes SRVCC-based eCSFB operation possible information. The UE context update request message or the initial UE context setup request message may further include air interface capability information of the UE.

The moving unit 603 is specifically configured to send a radio resource control connection release message to the UE, where corresponding CSFB indication information is carried to trigger redirection-based CSFB or inter-system cell change-based CSFB of the UE. Alternatively, the moving unit 603 is specifically configured to send a handover request message to the core network device, where corresponding CSFB indication information is carried to trigger packet service handover-based CSFB or SRVCC-based CSFB of the UE.

Optionally, the network device may further include a responding unit 604, configured to send a UE context update response message or an initial UE context setup response message to the core network device.

The network device is a core network device, for example, an MME, the first network is an LTE network, and the second network is a second-generation network or a third-generation network. In this case, in an embodiment of the present disclosure, the first determining unit 601 is specifically configured to receive a location report message sent by an access network control device, and the first determining unit 601 determines, according to the location report message, that the serving cell handover process of the UE is ended.

The second determining unit 602 is specifically configured to determine that before the first determining unit 601 receives the location report message, an extended service request message of the UE has been received. The second determining unit 602 determines, according to the extended service request message, that the UE needs to be moved to the second network.

In another embodiment of the present disclosure, the first determining unit 601 is specifically configured to receive a bearer update response message or a bearer setup response message that is sent by a serving gateway, where the bearer update response message or the bearer setup response message is a response message that is sent by the serving gateway to respond to a bearer update request or a bearer setup request that is sent by the network device, the bearer update request or the bearer setup request is sent by the network device to the serving gateway when the network device receives a path switching request message or a handover completion message that is sent by an access network control device, and the path switching request message indicates that a serving cell is a second cell. The first determining unit 601 determines, according to the bearer update response message or the bearer setup response message, that the serving cell handover process of the UE is ended.

The second determining unit 602 determines that before the first determining unit 601 receives the bearer update response message or the bearer setup response message, an extended service request message of the UE has been received.

The second determining unit 602 determines, according to the extended service request message, that the UE needs to be moved to the second network.

The moving unit 603 is specifically configured to send a UE context update request message or an initial UE context setup request message to the access network control device, where the UE context update request message or the initial UE context setup request message includes circuit switched fallback indication information, to instruct the access network control device to move the UE to the second network.

Further, the network device further includes a third determining unit 605, configured to determine that the UE supports SRVCC-based eCSFB. The UE context update request message or the initial UE context setup request message sent by the moving unit 603 further includes SRVCC-based eCSFB operation possible information. Optionally, the UE context update request message or the initial UE context setup request message further includes air interface capability information of the UE. The third determining unit 605 is specifically configured to determine, according to an attach request message or a tracking area update request message of the UE, that the UE supports SRVCC-based eCSFB. Alternatively, the third determining unit 605 obtains identification information of the UE, for example, an IMEI or an IMSI of the UE; and determines, according to the identification information of the UE, that the UE supports SRVCC-based eCSFB.

It should be noted that, in this embodiment of the present disclosure, the first determining unit 601, the second determining unit 602, the moving unit 603, the responding unit 604, and the third determining unit 605 may be implemented by using one or more processors. For details of a procedure of interaction between the units, refer to the description in the method embodiment, and details are not described herein again.

According to the network device in this embodiment of the present disclosure, when CSFB triggered by a CS service initiated by UE conflicts with a serving cell handover process of the UE, after completion of the serving cell handover process of the UE, the UE may be moved to a network supporting the CS service, so that the CS service of the UE can continue to be performed. In this way, a success rate of establishing the CS service is increased.

Figure 7:
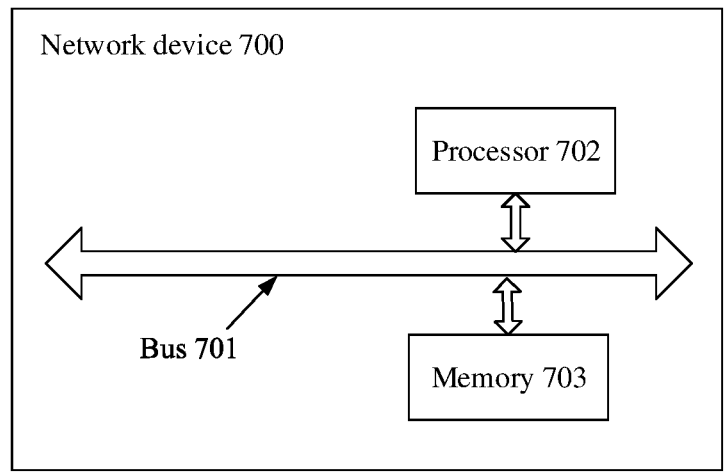
FIG. 7 is a structural diagram of a network device according to another embodiment of the present disclosure.

FIG. 7 is a structural diagram of a network device according to another embodiment of the present disclosure. As shown in FIG. 7, the network device 700 of this embodiment includes: a bus 701, a processor 702 connected to the bus 701, and a memory 703 connected to the bus 701. The memory 703 stores a set of program code, and the memory 703 may include a non-volatile memory (Non-volatile Memory). The processor 702 may be a central processing unit (CPU), or an application specific integrated circuit ASIC (ASIC), or one or more integrated circuits configured to implement this embodiment of the present disclosure. The processor 702 invokes, by using the bus 701, a program stored in the memory 703, to determine that a serving cell handover process of UE is ended; determine that before the serving cell handover process of the UE is ended, it has been determined that the UE needs to be moved to a second network, where the second network is a network that supports a circuit switched service; and move the UE to the second network.

In an embodiment of the present disclosure, for example, the network device is an access network control device, for example, an eNodeB, the second network is a WCDMA network or a GSM network, and the first network is an LTE network.

If a source serving cell of the UE is the first cell, a destination serving cell is the second cell, and both the first cell and the second cell are managed by the same access network control device, the processor 702 determines, according to an access message such as a handover completion message or a handover acknowledgment message sent in the second cell by the UE, that the serving cell handover process of the UE is ended.

If a source serving cell of the UE is the first cell, a destination serving cell is the second cell, the second cell is managed by the access network control device, and the first cell is managed by another access network control device, the processor 702 determines, according to a path switching response message sent by a core network device, that the serving cell handover process of the UE is ended. The path switching response message is sent by the core network device after the core network device receives a path switching request message sent by the network device, and the path switching request message indicates that a serving cell of the UE is the second cell.

The processor 702 determines that before the serving cell handover process of the UE is ended, a UE context update request message or an initial UE context setup request message that is sent by the core network device has been received, where the UE context update request message or the initial UE context setup request message includes circuit switched fallback indication information, and the circuit switched fallback indication information is used to instruct to move the UE to the second network. The processor 702 determines, according to the UE context update request message or the initial UE context setup request message, that the UE needs to be moved to the second network. Further, the UE context update request message or the initial UE context setup request message may further include SRVCC-based eCSFB operation possible information to indicate that CSFB may be performed in an SRVCC-based manner. Optionally, the UE context update request message or the initial UE context setup request message may further include air interface capability information of the UE.

The processor 702 may move the UE to the second network in multiple manners, for example, send a radio resource control connection release message to the UE, where different CSFB indication information is carried to trigger redirection-based CSFB or inter-system cell change-based CSFB of the UE; or may send a handover request message to the core network device, where different CSFB indication information is carried to trigger packet service handover-based CSFB or SRVCC-based CSFB of the UE.

Optionally, the processor 702 may further send a UE context update response message or an initial UE context setup response message to the core network device before the processor 702 moves the UE to the second network.

In another embodiment of the present disclosure, for example, the network device is a core network device, for example, an MME, the second network is a WCDMA network or a GSM network, and the first network is an LTE network.

The processor 702 may determine in multiple manners that the serving cell handover process of the UE is ended. For example, the processor 702 determines, according to a location report message sent by an access network control device, that the serving cell handover process of the UE is ended. The processor 702 determines that before the location report message is received, an extended service request message of the UE has been received, and the processor 702 determines, according to the extended service request message, that the UE needs to be moved to the second network.

For another example, the processor 702 may determine, according to a bearer update response message or a bearer setup response message that is sent by the serving gateway, that the serving cell handover process of the UE is ended. The bearer update response message or the bearer setup response message is a response message that is sent by the serving gateway to respond to a bearer update request or a bearer setup request that is sent by the network device, the bearer update request or the bearer setup request is sent by the network device to the serving gateway after the network device receives a path switching request message that is sent by an access network control device, and the path switching request message indicates that a serving cell is the second cell. The processor 702 determines that before the bearer update response message or the bearer setup response message is received, an extended service request message of the UE has been received, and determines, according to the extended service request message, that the UE needs to be moved to the second network.

The processor 702 is specifically configured to send a UE context update request message or an initial UE context setup request message to the access network control device to move the UE to the second network, where the UE context update request message or the initial UE context setup request message includes circuit switched fallback indication information, to instruct the access network control device to move the UE to the second network. Further, before the processor 702 moves the UE to the second network, the processor 702 may further determine in multiple manners that the UE supports single radio voice call continuity SRVCC-based enhanced circuit switched fallback eCSFB, and adds SRVCC-based eCSFB operation possible information to the UE context update request message or the initial UE context setup request message. For example, the processor 702 determines, according to an attach request message or a tracking area update request message of the UE, that the UE supports SRVCC-based eCSFB. For another example, the processor 702 obtains identification information of the UE, and determines, according to the identification information of the UE, that the UE supports SRVCC-based eCSFB.

It should be noted that, for a technical solution specifically implemented by the processor 702 by invoking the program code stored in the memory 703, refer to the foregoing method embodiment. An implementation principle and a technical effect of the technical solution are similar to those of the foregoing method embodiment. For details, refer to the related description in the foregoing embodiment, and details are not described herein again.

Figure 8:
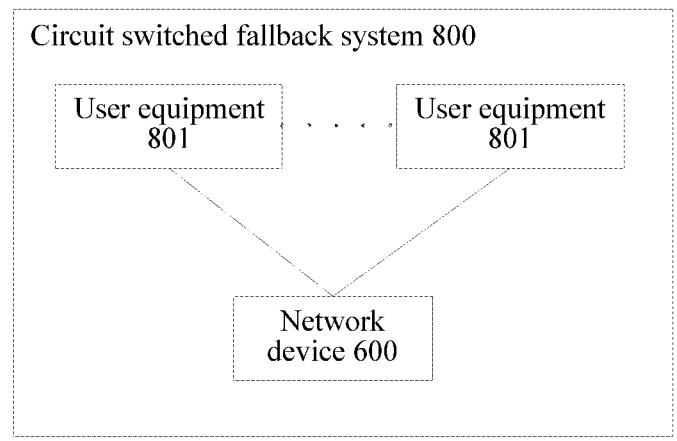
FIG. 8 is a schematic networking diagram of a circuit switched fallback system according to another embodiment of the present disclosure.

FIG. 8 is a schematic networking diagram of a CSFB system 800 according to another embodiment of the present disclosure. As shown in FIG. 8, the system 800 includes: at least one UE 801 and a network device.

The network device may be the network device 600 shown in FIG. 6 or the network device 700 shown in FIG. 7. The network device 600 and the network device 700 have been described in the embodiments shown in FIG. 6 and FIG. 7, and an implementation principle and a technical effect of the network device are similar to those of the network device 600 or the network device 700. Therefore, for details, refer to the related description in the foregoing embodiment, and details are not described herein again.

In the several embodiments provided in the present application, it should be understood that the disclosed device and method may be implemented in other manners. For example, the described device embodiment is merely an example. For example, the unit division is merely logical function division and may be other division in actual implementation. For example, a plurality of units or components may be combined or integrated into another device, or some features may be ignored or not performed.

In addition, functional units in the embodiments of the present disclosure may be integrated into one processing unit, or each of the units may exist alone physically, or two or more units are integrated into one unit.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present disclosure includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A method for use by a network device on a first network, the method comprising:
   sending, by the network device, a handover command message to a user equipment (UE) for a serving cell handover process of the UE, the network device being a core network device;
   determining, by the network device, after the handover command message is sent and before the serving cell handover process of the UE has ended, and when the network device has received an extended service request message of the UE before the network device receives a bearer update response message or a bearer setup response message sent by a serving gateway, that the UE needs to be moved to a second network, wherein the second network is a network that supports a circuit switched service;

receiving the bearer update response message or the bearer setup response message sent by the serving gateway, wherein the bearer update response message or the bearer setup response message is sent by the serving gateway in response to a bearer update request or a bearer setup request that is sent by the network device, the bearer update request or the bearer setup request is sent by the network device to the serving gateway when the network device receives a path switching request message or a handover completion message that is sent by an access network control device, and the path switching request message or the handover completion message indicates that a serving cell is a second cell;

determining, by the network device according to the bearer update response message or the bearer setup response message that is sent by the serving gateway, that the serving cell handover process of the UE has ended; and moving, by the network device, the UE to the second network.

2. The method according to claim 1, wherein determining, by the network device, after the handover command message is sent and before the serving cell handover process of the UE has ended, that the UE needs to be moved to the second network comprises:

receiving a UE context update request message or an initial UE context setup request message sent by a core network device before the serving cell handover process of the UE has ended, wherein the UE context update request message or the initial UE context setup request message comprises circuit switched fallback indication information, the UE context update request message or the initial UE context setup request message for instructing the network device to move the UE to the second network.

3. The method according to claim 2, wherein the UE context update request message or the initial UE context setup request message further comprises single radio voice call continuity (SRVCC)-based enhanced circuit switched fallback (eCSFB) operation possible information.

4. The method according to claim 2, wherein before moving, by the network device, the UE to the second network, the method further comprises:

sending, by the network device, a UE context update response message or an initial UE context setup response message to the core network device.

5. The method according to claim 2, wherein moving, by the network device, the UE to the second network comprises:

sending, by the network device, a radio resource control connection release message to the UE for triggering redirection-based CSFB or inter-system cell change-based CSFB of the UE; or sending, by the network device, a handover request message to the core network device for triggering packet service handover-based CSFB or SRVCC-based eCSFB of the UE.

6. The method according to claim 1, wherein:

a source serving cell of the UE is a first cell;

determining, by the network device, that the serving cell handover process of the UE has ended comprises:

determining, by the network device according to a location report message sent by an access network control device, that the serving cell handover process of the UE has ended, wherein the location report message is sent by the access network control device to the network device after the access network control device determines that a location of the UE changes from the first cell to a second cell, and both the first cell and the second cell are cells managed by the access network control device; and determining, by the network device, after the handover command message is sent and before the serving cell handover process of the UE has ended, that the UE needs to be moved to the second network comprises:

when the network device has received an extended service request message of the UE before the network device receives the location report message, determining, by the network device, that the UE needs to be moved to the second network.

7. The method according to claim 1, wherein:

moving, by the network device, the UE to the second network comprises:

sending, by the network device, a UE context update request message or an initial UE context setup request message to an access network control device, wherein the UE context update request message or the initial UE context setup request message comprises circuit switched fallback indication information, the UE context update request message or the initial UE context setup request message for instructing the access network control device to move the UE to the second network.

8. The method according to claim 7, wherein:

before moving, by the network device, the UE to the second network, the method comprises:

determining, by the network device, that the UE supports single radio voice call continuity (SRVCC)-based enhanced circuit switched fallback (eCSFB); and the UE context update request message or the initial UE context setup request message further comprises SRVCC-based eCSFB operation possible information.

9. The method according to claim 8, wherein determining, by the network device, that the UE supports SRVCC-based eCSFB comprises:

determining, by the network device according to an attach request message or a tracking area update request message of the UE, that the UE supports SRVCC-based eCSFB; or obtaining, by the network device, identification information of the UE, wherein the identification information of the UE comprises at least one of the following: an international mobile equipment identity (IMEI) or an international mobile subscriber identity (IMSI), and determining, by the network device according to the identification information of the UE, that the UE supports SRVCC-based eCSFB.

10. A device, comprising:

a memory storing instructions; and a processor coupled to the memory to execute the instructions to:

send a handover command message to a user equipment (UE) for a serving cell handover process of the UE, after the handover command message is sent and before the serving cell handover process of the UE has ended, and when an extended service request message of the UE has been received before a bearer update response message or a bearer setup response message is received from a serving gateway, determine that the UE needs to be moved to a second network, wherein the second network is a network that supports a circuit switched service, receive the bearer update response message or the bearer setup response message sent by the serving gateway, wherein the bearer update response message or the bearer setup response message is sent by the serving gateway in response to a bearer update request or a bearer setup request sent by the device, the bearer update request or the bearer setup request is sent by the device to the serving gateway when the device receives a path switching request message or a handover completion message sent by an access network control device, and the path switching request message or the handover completion message indicates that a serving cell is a second cell, determine, according to the bearer update response message or the bearer setup response message, that the serving cell handover process of the UE has ended, and move the UE to the second network.

11. The device according to claim 10, wherein to determine that the UE needs to be moved to the second network, the processor executes the instructions to:

receive a UE context update request message or an initial UE context setup request message sent by a core network device before the serving cell handover process of the UE is ended, wherein the UE context update request message or the initial UE context setup request message comprises circuit switched fallback indication information, the UE context update request message or the initial UE context setup request message for instructing the device to move the UE to the second network.

12. The device according to claim 11, wherein the UE context update request message or the initial UE context setup request message further comprises single radio voice call continuity (SRVCC)-based enhanced circuit switched fallback (eCSFB) operation possible information.

13. The device according to claim 11, wherein the processor further executes the instructions to:

send a UE context update response message or an initial UE context setup response message to the core network device.

14. The device according to claim 11, wherein the processor executes the instructions to:

send a radio resource control connection release message to the UE for triggering redirection-based CSFB or inter-system cell change-based CSFB of the UE; or send a handover request message to the core network device for triggering packet service handover-based CSFB or SRVCC-based eCSFB of the UE.

15. The device according to claim 10, wherein the processor executes the instructions to:

receive a location report message sent by an access network control device;

determine, according to the location report message, that the serving cell handover process of the UE has ended, wherein the location report message is sent by the access network control device to the device after the access network control device determines that a location of the UE changes from a first cell to a second cell, and both the first cell and the second cell are cells managed by the access network control device; and when an extended service request message of the UE has been received before the location report message is received, determine that the UE needs to be moved to the second network.

16. The device according to claim 10, wherein the processor executes the instructions to:

send a UE context update request message or an initial UE context setup request message to an access network control device, wherein the UE context update request message or the initial UE context setup request message comprises circuit switched fallback indication information, the UE context update request message or the initial UE context setup request message for instructing the access network control device to move the UE to the second network.

17. The device according to claim 16, wherein:

the processor executes the instructions to:

determine that the UE supports single radio voice call continuity (SRVCC)-based enhanced circuit switched fallback (eCSFB); and the UE context update request message or the initial UE context setup request message further comprises SRVCC-based eCSFB operation possible information.

18. The device according to claim 17, wherein the processor executes the instructions to:

determine, according to an attach request message or a tracking area update request message of the UE, that the UE supports SRVCC-based eCSFB; or obtain identification information of the UE, wherein the identification information of the UE comprises at least one of the following: an international mobile equipment identity (IMEI) or an international mobile subscriber identity (IMSI), and determine, according to the identification information of the UE, the UE supports SRVCC-based eCSFB.

* * * * *